United States Patent
Bassett et al.

(10) Patent No.: US 11,292,584 B2
(45) Date of Patent: Apr. 5, 2022

(54) COUPLING ARRANGEMENT AND AIRCRAFT

(71) Applicant: Liebherr-Aerospace Lindenberg GmbH, Lindenberg (DE)

(72) Inventors: Frederick Bassett, Scheidegg (DE); Anton Gaile, Leutkirch (DE)

(73) Assignee: LIEBHERR-AEROSPACE LINDENBERG GMBH, Lindenberg (DE)

( * ) Notice: Subject to any disclaimer, the term of this patent is extended or adjusted under 35 U.S.C. 154(b) by 25 days.

(21) Appl. No.: 16/687,716

(22) Filed: Nov. 19, 2019

(65) Prior Publication Data

US 2020/0156765 A1 May 21, 2020

(30) Foreign Application Priority Data

Nov. 21, 2018 (DE) .................... 10 2018 129 367.4

(51) Int. Cl.
| | |
|---|---|
| *B64C 13/28* | (2006.01) |
| *F16D 41/066* | (2006.01) |
| *F16D 7/08* | (2006.01) |
| *F16D 43/206* | (2006.01) |
| *F16D 41/06* | (2006.01) |

(52) U.S. Cl.
CPC ............. *B64C 13/28* (2013.01); *F16D 7/08* (2013.01); *F16D 41/066* (2013.01); *F16D 43/206* (2013.01); *F16D 2041/0605* (2013.01)

(58) Field of Classification Search
CPC ......... B64C 13/28; F16D 7/08; F16D 43/206; F16D 41/066; F16D 2041/0605
See application file for complete search history.

(56) References Cited

U.S. PATENT DOCUMENTS

| | | | | | |
|---|---|---|---|---|---|
| 2,818,712 | A | * | 1/1958 | Barnes ...................... | F16D 7/08 464/36 |
| 4,062,203 | A | * | 12/1977 | Leonard ................. | B25B 23/141 464/38 |
| 4,579,201 | A | * | 4/1986 | Tiedeman ................. | F16D 7/08 192/223.4 |
| 2012/0318627 | A1 | * | 12/2012 | Hill ........................ | F16D 43/206 192/56.1 |
| 2016/0298705 | A1 | * | 10/2016 | Davies ................... | F16D 43/216 |

* cited by examiner

*Primary Examiner* — Ernesto A Suarez
*Assistant Examiner* — Lori Wu
(74) *Attorney, Agent, or Firm* — Kilyk & Bowersox, P.L.L.C.

(57) ABSTRACT

The present invention relates to a coupling arrangement for a driving device, wherein the coupling arrangement comprises an input, an output and a coupling, wherein the coupling is non-rotatably connected with the input or with the output, wherein the coupling furthermore comprises torque transmission means which in the coupled condition are configured to connect the output with the input for transmitting a torque from the input to the output, wherein upon exceedance of a torque threshold value in a first operating condition the torque transmission means are arranged such that the input is periodically separated from and connected with the output, and that when the torque threshold value is not reached in a second operating condition, the torque transmission means are arranged such that the input is permanently connected with the output for transmitting a torque.

7 Claims, 2 Drawing Sheets

COUPLING ARRANGEMENT AND AIRCRAFT

FIELD OF THE INVENTION

The present invention relates to a coupling arrangement for a driving device, wherein the coupling arrangement comprises an input, an output and a coupling, wherein the coupling is non-rotatably connected with the input or with the output for torque transmission, wherein the coupling furthermore comprises torque transmission means which in the coupled condition are configured to connect the output with the input in order to transmit a torque from the input to the output.

Furthermore, the present invention relates to an aircraft, in particular an airplane, comprising such a coupling arrangement.

BACKGROUND OF THE INVENTION

Coupling arrangements for driving devices, in particular in airplanes, are known from the prior art, which comprise a protection system that prevents the occurrence of inadmissibly high torque values. This protection system serves to decouple the output from the input when the output is loaded with an excessively high torque. These large torque values for example might result from the fact that the output or a component connected therewith, such as a foldable wing tip, is jammed.

The protection systems known from the prior art can be of the mechanical or electronic type. In mechanical protection systems a rise of the driving torque is detected. Upon exceedance of a torque threshold value, the protection system is actuated such that the driving torque is reduced as heat and/or as an elastic deformation of a mechanical element. For this purpose, various mechanical devices can be used, such as torque limiters, torque transmission limiters or shear pins.

In torque limiters, the torque transmitted by the drive is reduced by friction discs so that the torque to be transmitted is limited.

In torque transmission limiters the torque is reduced by friction by means of mechanical elements in the form of coupling elements. The coupling elements are slightly shifted so that the same can make contact with each other and thus limit or prevent the torque transmission.

When using a shear pin, the torque is limited by the fact that upon exceedance of a certain threshold value of the torque the pin breaks so that the input is separated from the output.

In electronic protection systems a control unit detects the torque transmitted by the drive. This control unit is designed such that it switches off the drive when the transmitted torque exceeds a certain value.

What is disadvantageous in the prior art is the fact that the driving device is blocked, that the input is permanently separated from the output and/or that the output must be moved back in order to again put the system into operation.

SUMMARY OF THE PRESENT INVENTION

Therefore, it is the object underlying the present invention to create a coupling arrangement as mentioned above, in which the torque is limited without the input and the output permanently remaining separated from each other.

This object is solved by a coupling arrangement. Accordingly, upon exceedance of a torque threshold value in a first operating condition the torque transmission means are arranged such that the input is periodically separated from and connected with the output. Furthermore, when the torque threshold value is not reached in a second operating condition the torque transmission means are arranged such that the input is permanently connected with the output for transmitting a torque.

Thus, it is possible to decouple the input from the output for a short period of time upon exceedance of a torque threshold value. Subsequently, coupling-in is effected so that the torque can be transmitted between input and output. When the output then is still jammed and the torque threshold value is exceeded again, the input is again decoupled from the output. By periodically coupling the input out of and into the output it preferably is ensured that the output remains blocked in its position, i.e. does not move back, for example due to a wind load, and that the output elements are not damaged by too large a torque. In the final analysis, this leads to the advantage that the torque transmission from the input to the output is restored automatically when the output no longer is jammed or blocked otherwise.

In the case of a jam at the flap or wing tip, the coupling is opened under a continued drive and prevents the driving torque from damaging the components up to the jam or from damaging the structure or the flap or the wing tip itself.

The coupling directly or indirectly is non-rotatably connected with the input or with the output. Preferably, the coupling is non-rotatably connected with the output and rotatably mounted relative to the input.

The connection between the coupling and the input or output can be of the positive and/or non-positive type. Advantageously, the connection is formed by serrations.

According to an advantageous embodiment, the output of the coupling arrangement comprises a drive shaft relative to which the input is rotatably mounted.

According to an advantageous embodiment of the invention the torque transmission means are a ball ramp. The ball ramp for example can be configured as an independent mechanical element. It is advantageous, however, when the input of the coupling arrangement includes a housing that rotates with the input and in which the ball ramp is formed as a recess. Alternatively or in addition, it can be provided that the ball ramp is formed as a recess in a wall of the coupling.

Advantageously, the torque threshold value is determined and/or adjustable by the inclination of the ball ramp. Thus, it is possible to exactly define the torque threshold value.

It is particularly advantageous when the ball ramps are configured such that they include a plurality of ramps which are arranged relative to each other such that a ball can sequentially roll off from one ramp into the next ramp. Thus, it is possible to effect the coupling of the input out of and into the output by the ball periodically rolling off from one ramp into the next ramp of a ball ramp.

Furthermore, the ball ramps can include one or more pockets in which the ball can be received such that a torque transmission takes place. The pocket is arranged such that the ball can roll out of the pocket. When the ball is disposed in the region between two pockets, no torque transmission takes place.

Preferably, the pockets each are disposed between two ramps of a ball ramp so that there is a sequence of ramps and pockets.

The torque threshold value can be determined by a pretensioned spring acting on the torque transmission means and/or be adjustable by the same. The pretensioned spring can directly or indirectly act on the torque transmission means.

According to the invention it can be provided that the torque transmission means are arranged such that in the first operating condition moving back of the output is prevented by periodically separating the output from and connecting the output with the input, in particular when this occurs at a high frequency.

The coupling can include a first coupling part which is non-rotatably connected with the output and a second coupling part which is axially movable relative to the first coupling part.

In this case it is particularly advantageous when a carrier is provided, which extends between the first and the second coupling part and connects the two coupling parts such that the rotary movement of the second coupling part leads to a rotary movement of the first coupling part.

The invention furthermore relates to an aircraft, in particular an airplane, comprising a coupling arrangement.

The coupling arrangement can be located between an input of the aircraft and a foldable wing tip or wing tip folding system and/or a buoyancy aid or highlift system and/or a primary and/or secondary electromechanical actuation system (EMA system) and/or a thrust reversal actuation system (TRAS) and/or a thrust reversal cowling actuation system and/or a door actuation system and/or a turbine vane actuation system.

At this point it should be noted that the term "a/an" not necessarily designates exactly one of the elements in question, although this represents a possible embodiment, but can also represent a plurality of the elements. The same applies for the use of the plural form, which can also comprise only one of the elements, and conversely for the use of the singular form, which can also designate several elements.

Further features and advantages of the invention will be explained in detail with reference to an exemplary embodiment illustrated in the drawings.

DETAILED DESCRIPTION OF THE PRESENT INVENTION

Figure 1:
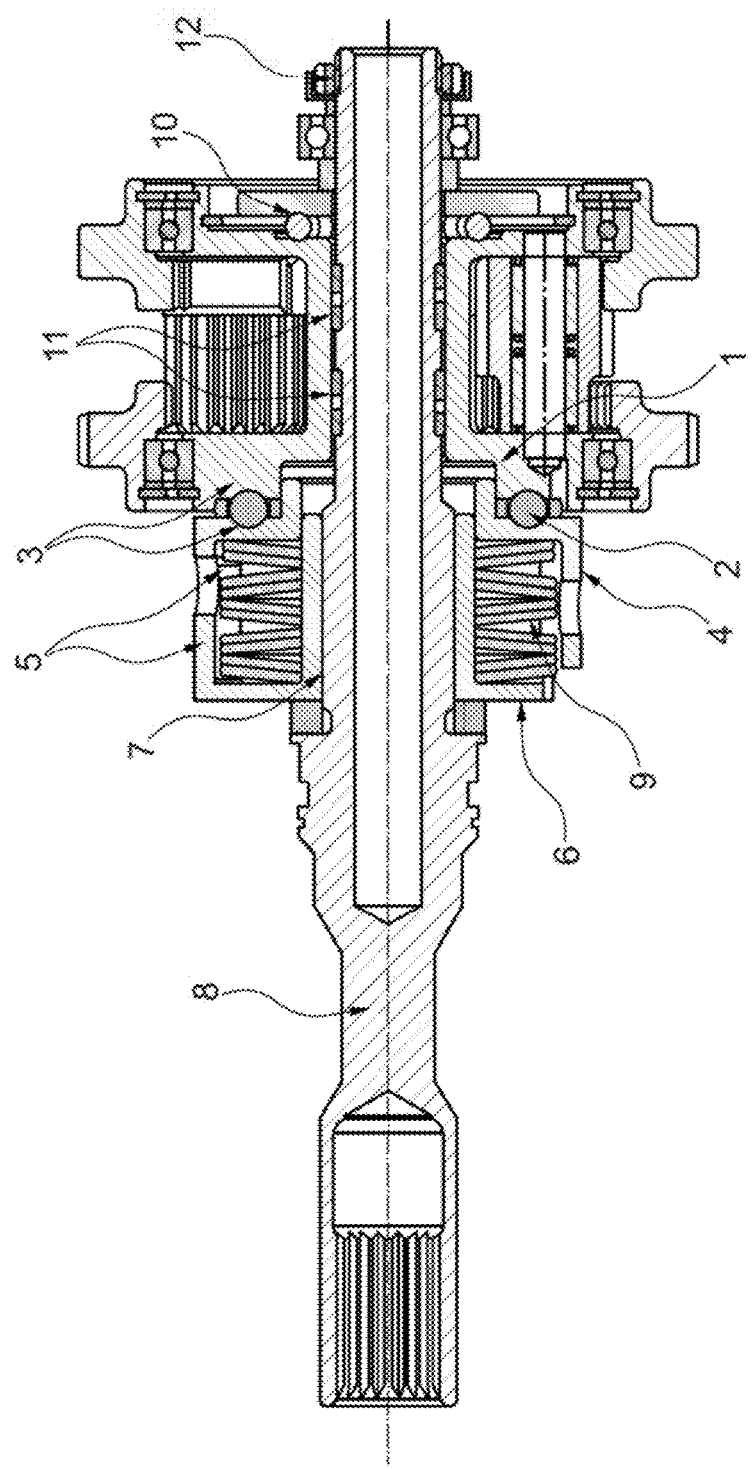
FIG. 1: shows a coupling arrangement according to the invention.

An input 1 is rotatably mounted relative to an output 8 by means of the bearings 10 and 11. For torque transmission from the input 1 to the output 8 a coupling is provided. The same includes a first coupling part 6 which is non-rotatably connected with the output 8, and a second coupling part 4 which is rotatable relative to the output 8. The connection between the first coupling part 6 and the output 8 is formed by serrations 7.

At the first coupling part 6, the axial bearing 10 with the threaded nut 12 completes the load circuit between itself and the bearing or support on the output 8.

The input 1 is connected with the second coupling part 4 by means of a ball ramp mechanism 3. This ball ramp mechanism 3 forms the torque transmission means or a part of the same.

The ball ramp mechanism 3 has two opposed ball ramps, one of which is arranged in the housing of the input 1 and the other one is arranged in the second coupling part 4. Between the two ball ramps one or more balls 2 are arranged.

Figure 2A:
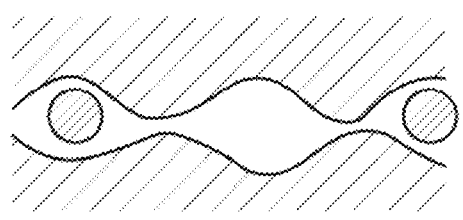
FIGS. 2A and 2B: show schematic views of the ball ramps with a ball.
Figure 2B:
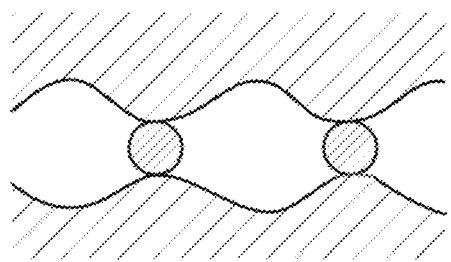

One or both ball ramps have one or more obliquely extending ramps for the balls and one or more adjoining pockets or other depressions. When the balls are in the pockets, as this is shown in FIG. 2A, a torque is transmitted, as is also the case in the normal operating condition. When the balls are on the ramps, i.e. not in the pockets, as this is shown in FIG. 2B, no torque transmission takes place.

When the output is blocked, e.g. due to a case of jamming of the wing tip, the balls always move from one pocket to the next. Due to this continued movement (slipping through), energy is destroyed.

A spring 9 extends between the first coupling part 6 and the second coupling part 4. A carrier 5 likewise extends between the first coupling part 6 and the second coupling part 4. The carrier 5 connects the two coupling parts 4 and 6 such that the rotary movement of the second coupling part 4 leads to a rotary movement of the first coupling part 6.

The spring 9 permits a particular force, which is specified by the properties of the spring 9, to act on the ball ramp.

In normal operation (i.e. in the second operating condition as claimed) the spring 9 effects that the ball ramp remains closed and that a torque is transmitted from the input 1 to the output 8 via the ball ramp mechanism 3. The carrier 5 ensures that the torque transmission can take place also with a partly open ball ramp. This is the case for example when the input 1 provides an increased torque and the output 8 cannot immediately adapt to the increased torque.

When the output 8 is jammed or slowed down, for example because a flap connected with the output is jammed or otherwise blocked, the input-side torque is maintained, which due to the jammed or blocked condition can lead to a damage of the coupling arrangement or a part arranged on the output side.

When the torque exceeds a torque threshold value defined by the spring 9 and the ball ramp mechanism 3, the ball ramp opens, i.e. the axial distance of the ball ramps increases, and the second coupling part 4 moves towards the first coupling part 6, whereby the spring 9 is compressed.

When the ball ramp is completely open, the balls 2 are positioned between the pockets so that the torque transmission is completely interrupted. Subsequently, the balls 2 roll down the ramps and into the pockets so that the input 1 and the output 8 again are in the coupled condition.

The input 1 then again transmits a torque to the output 8. In case the output 8 still is jammed, the procedure explained above is repeated, i.e. coupling out is effected again by the balls rolling out of the pockets.

By periodically coupling out and in it is achieved that the output 8 maintains its position and is not moved back. At the same time, the occurrence of excessively high torque values is prevented.

The invention claimed is:

1. A coupling arrangement for a driving device for a wing tip of an aircraft, wherein the coupling arrangement comprises an input, an output and a coupling, the coupling comprising a first coupling element and a second coupling element, the coupling is non-rotatably connected with the input or with the output, wherein the coupling furthermore comprises torque transmission means which in the coupled condition are configured to connect the output with the input for transmitting a torque from the input to the output, wherein upon exceedance of a torque threshold value in a first operating condition the torque transmission means are arranged such that the input is periodically separated from and connected with the input, and that when the torque threshold value is not reached in a second operating condition, the torque transmission means are arranged such that the input is permanently connected with the output for transmitting a torque, wherein a ball ramp mechanism forms the torque transmission means or a part of the same, the ball ramp mechanism has two opposed ball ramps, one of the two opposed ball ramps arranged in a housing of the input and the other of the two opposed ball ramps arranged in the second coupling element, the ball ramps have one or more pockets or other depressions in which a ball is configured to be received such that a torque transmission takes place, and balls always move from one pocket to the next when the output is blocked.

2. The coupling arrangement according to claim 1, wherein the ball ramps are configured such that they have a plurality of ramps which are arranged relative to each other such that the ball can sequentially roll off from one ramp into the next ramp.

3. The coupling arrangement according to claim 1, wherein the torque threshold value is determined by a pretensioned spring acting on the torque transmission means and is adjustable by said spring.

4. The coupling arrangement according to claim 1, wherein the first coupling element is non-rotatably connected with the output and the second coupling element is axially movable relative to the first coupling element.

5. The coupling arrangement according to claim 4, wherein a carrier is provided, which extends between the first and the second coupling part and which connects the two coupling parts such that the rotary movement of the second coupling part leads to a rotary movement of the first coupling part.

6. An aircraft comprising the coupling arrangement according to claim 1.

7. The aircraft according to claim 6, wherein the coupling arrangement is disposed between an input of the aircraft and a foldable wing tip and/or a buoyancy aid and/or a primary and/or secondary electromechanical actuation system and/or a thrust reversal actuation system and/or a thrust reversal cowling actuation system and/or a door actuation system and/or a turbine vane actuation system.

* * * * *